(12) United States Patent
Kikuchi et al.

(10) Patent No.: US 6,208,102 B1
(45) Date of Patent: Mar. 27, 2001

(54) METHOD FOR CONTROLLING AUTOMOTIVE SLIDING DOORS

(75) Inventors: Taizo Kikuchi; Kazunari Ochi; Toru Namiki; Tatsumi Sakazume, all of Wako; Hiroshi Ono, Kiryu; Masami Sayama, Tochigi-ken, all of (JP)

(73) Assignees: Honda Giken Kogyo Kabushiki Kaisha, Tokyo; Mitsuba Corporation, Gunma-ken, both of (JP)

( * ) Notice: Subject to any disclaimer, the term of this patent is extended or adjusted under 35 U.S.C. 154(b) by 0 days.

(21) Appl. No.: 09/324,698

(22) Filed: Jun. 2, 1999

(30) Foreign Application Priority Data

| Jun. 2, 1998 | (JP) | 10-153313 |
| Jun. 2, 1998 | (JP) | 10-153319 |
| Jun. 4, 1998 | (JP) | 10-155520 |
| Oct. 30, 1998 | (JP) | 10-310355 |
| Oct. 30, 1998 | (JP) | 10-310359 |

(51) Int. Cl.$^7$ .................................................... G05B 5/00
(52) U.S. Cl. ........................ 318/466; 49/138; 318/282
(58) Field of Search .......................... 318/466, 280–282, 318/468; 49/138, 139, 26, 28, 360; 160/296; 187/316, 317

(56) References Cited

U.S. PATENT DOCUMENTS

| 4,621,452 | * | 11/1986 | Deeg ........................................ 49/28 |
| 4,713,591 | * | 12/1987 | McCloskey ........................... 318/257 |
| 4,999,551 | * | 3/1991 | Yoshida et al. ...................... 318/286 |
| 5,039,925 | * | 8/1991 | Schap .................................... 318/282 |
| 5,076,016 | * | 12/1991 | Adams et al. ......................... 49/360 |
| 5,708,338 | * | 1/1998 | Cook et al. ........................... 318/466 |
| 5,831,403 | * | 11/1998 | Kanki et al. .......................... 318/286 |

* cited by examiner

*Primary Examiner*—Robert E. Nappi
*Assistant Examiner*—Rina I. Duda
(74) *Attorney, Agent, or Firm*—Carrier, Blackman & Associates, P.C.; Joseph P. Carrier; William D. Blackman

(57) ABSTRACT

In a method for controlling a powered sliding door system, a standard time period for the sliding door to pass a calibration interval defined near a fully closed position under a standard duty ratio condition is measured, and the duty ratio of the drive pulse signal for the motor in the remaining interval of operation is determined from this standard time period so that the sliding door may move at a prescribed speed irrespective of the load acting on the door. This control method can be favorably used in combination with the process of detecting an obstacle in the path of the sliding door, which is based on the detection in the reduction in the speed of the sliding door, without any interference between them.

20 Claims, 9 Drawing Sheets

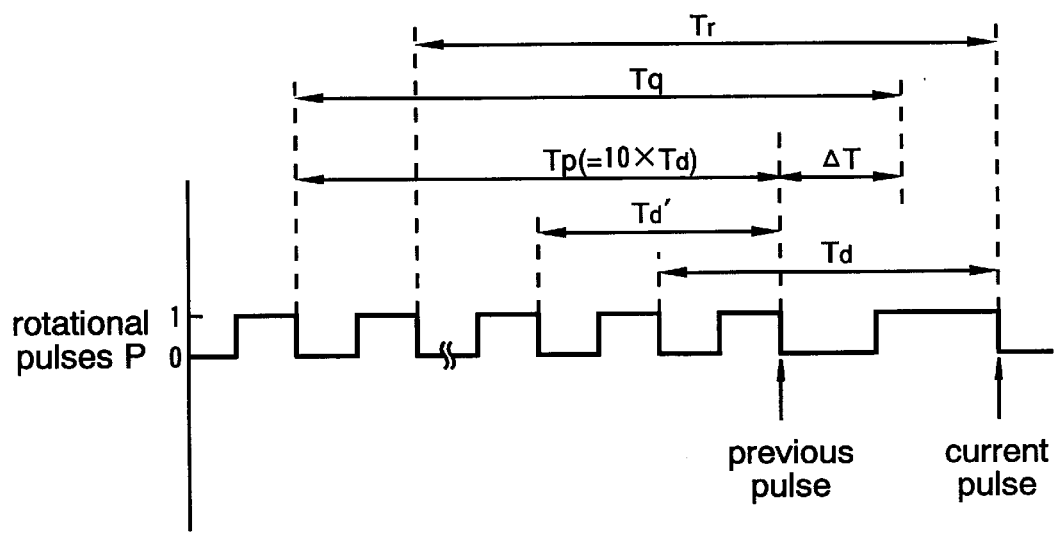
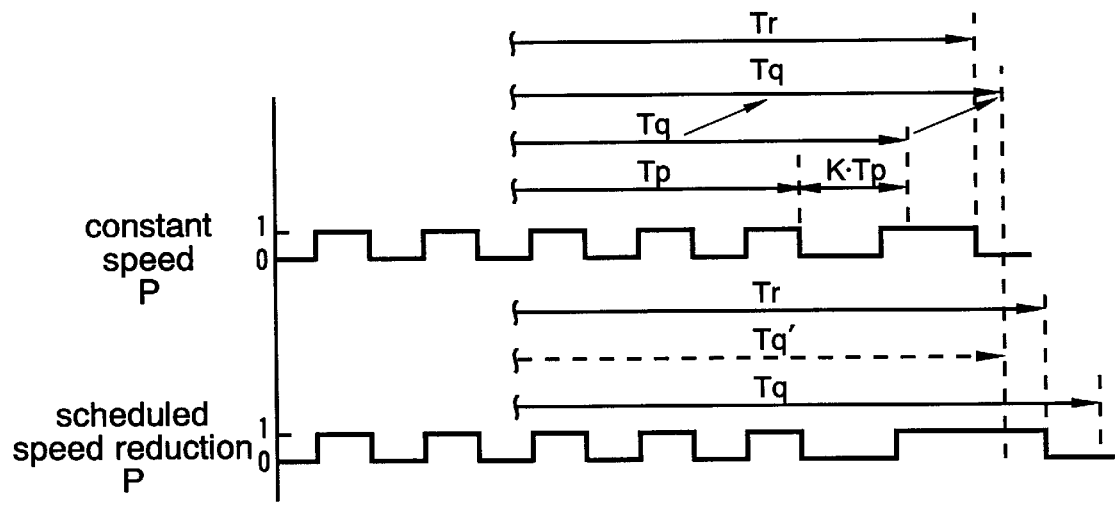

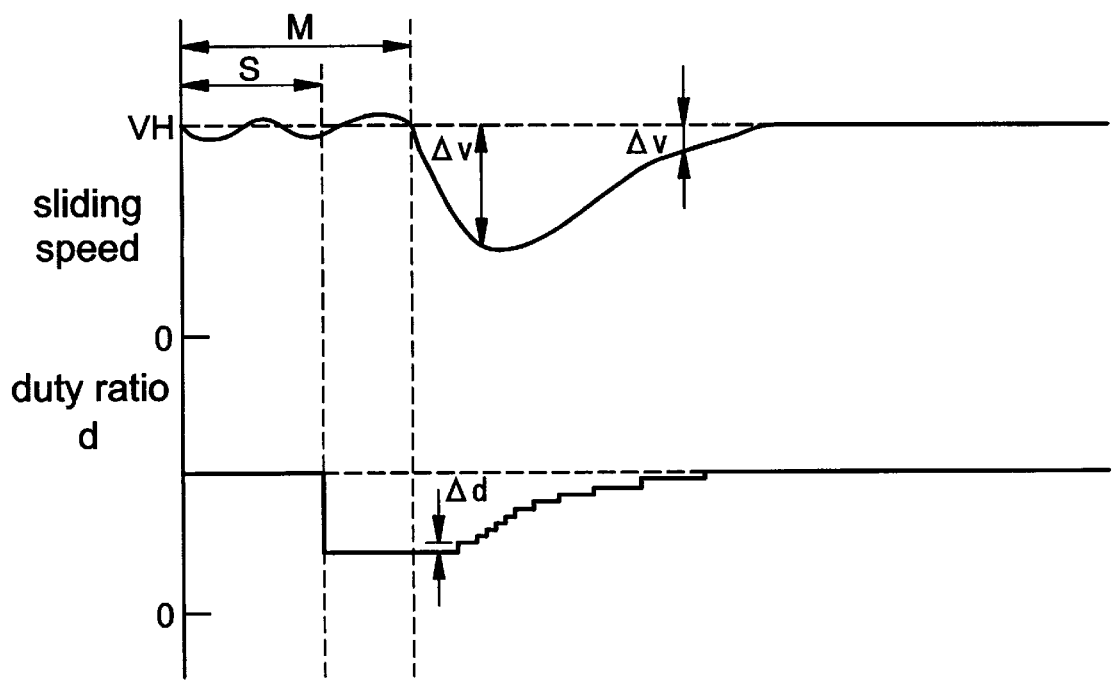
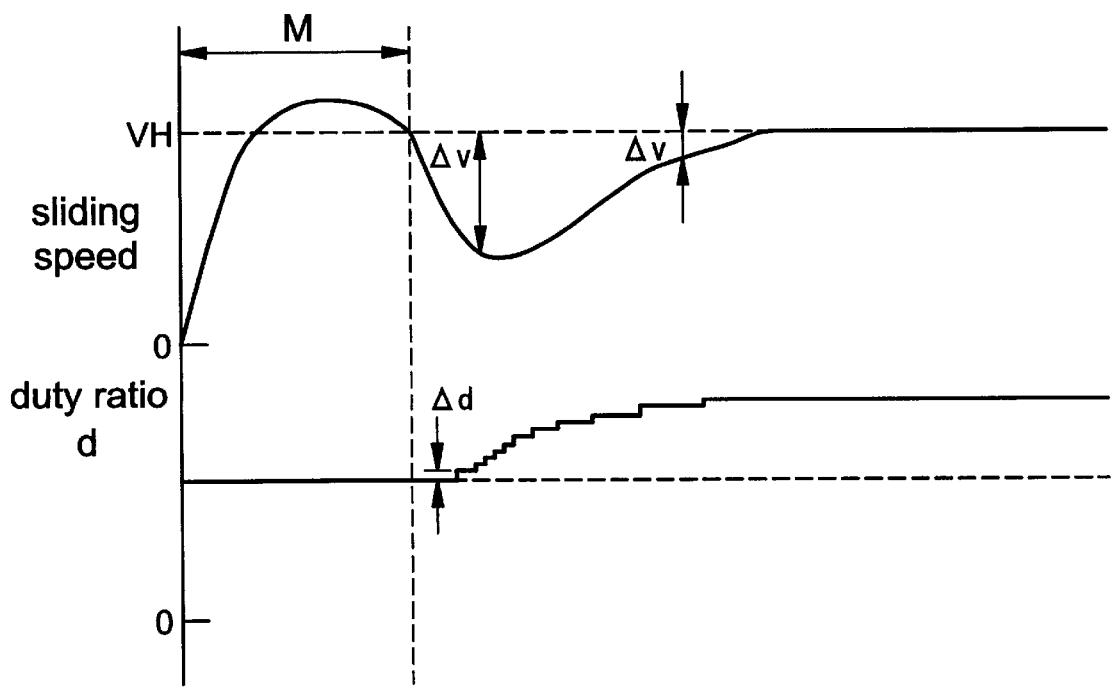

METHOD FOR CONTROLLING AUTOMOTIVE SLIDING DOORS

TECHNICAL FIELD

The present invention relates to a method for controlling automotive sliding doors which allows the door to be actuated with a minimum amount of time and is adapted for a control process for detecting an obstacle to the motion of the door.

BACKGROUND OF THE INVENTION

Sliding doors are being used in a wide range of motor vehicles, including specialized vehicles such as delivery vans, recreational vehicles, and vehicles for handicapped people as well as more ordinary vehicles. In recent years, motor-powered sliding doors are being more and more preferred because a significant effort is required to operate a sliding door without any power assist as the vehicle size increases and the sliding doors get massive more and more. This problem is particularly enhanced when the vehicle is parked on a slope, and the gravitational force acting on the door opposes the effort to either open or close the door.

In a motor powered sliding door, it is desirable to control the speed of the door at a fixed level without regard to the condition of the door. For this purpose, the motor for actuating the door can be conveniently controlled by using a duty ratio control which tries to keep the speed of the motion of the door at a pre-defined target value. This control process normally consists of a feedback control. In such a control process, electric pulses are obtained from the motor by using a rotary encoder or the like, and the duty ratio of the electric power supplied to the motor is changed so as to adjust the frequency of the rotational pulses indicative of the speed of the motion of the door to a desired value. Therefore, when the sliding door is subjected to a resistance which is greater than a normal level, typically due to the inclination of the road surface or an increase in the frictional resistance in the guide mechanism for the door, the duty ratio is increased so that the door can overcome such a resistance and maintain the fixed speed of motion. However, when the sliding door encounters a physical object in its path of motion, such an increase in the duty ratio would not be desirable, and a certain measure is necessary to favorably control the speed of the door at a fixed level without regard to the existing condition while providing a means for shutting down the actuation of the door when the door encounters an obstacle.

As an additional consideration for a powered sliding door, it is desirable to move the door in stages particularly when closing the door. When closing the door, the door should be moved at a high speed in the initial stage to minimize the time period required for closing the door, but as the door approaches the fully closed position, the speed of the motion of the door should be reduced to a low speed so as to avoid inadvertent holding or hitting of an object by the door. However, such an intentional reduction in the speed of the motion may be confused as being due to the presence of an object in the door. It is conceivable to put a mask on the interval of the scheduled reduction in the speed of the motion of the door for the control process for detecting an obstacle for the door. However, the presence of such a blackout region for the obstacle detecting control process is not desirable in view of ensuring a high level of reliability. It is also conceivable to reduce the speed of the door very gradually during the period of scheduled speed reduction, but it results in an undesirably long time period for closing the door.

A sliding door generally follows a linear path along a side of the vehicle body, but typically moves laterally inward as the door approaches the fully closed position. Thus, the door projects laterally outward from the side profile of the vehicle body during most of the travel of the door, but becomes flush with the side profile of the vehicle body in its fully closed state. For this purpose, the guide rail for the sliding door extends generally linearly along the side of the vehicle body, but curves inward toward the end thereof corresponding to the fully closed position. Therefore, when the vehicle is parked on a laterally inclined road surface which causes the vehicle body to tilt on one side, the sliding door on that side has to oppose the gravitational force as it moves on from the linear section of the guide rail to the inwardly curved section of the guide rail. The resulting increase in the load acting on the door could be confused as being caused by an obstacle for the door, and could therefore interfere with the control process for detecting an obstacle for the door.

Also, even though the sliding door may be normally powered by an electric motor, the door may receive an assisting or resisting force from the user. Such an assisting or resisting force could cause a significant change in the overall load acting on the door, and could therefore interfere with the control process for detecting an obstacle for the door. For instance, suppose that the user applies an assisting force to the door during its closing motion. This assisting force initially increases the speed of the door, but when this assisting force is removed, the speed of the door sharply drops, and the control unit could respond to it as if the door encountered an obstacle.

Relatively massive sliding doors are used in larger recreational vehicles which have been increasingly widely accepted by the consumer market. The gravitational force acting on such a massive door is so great that the reducing the drive force of the motor may not be adequate for controlling the speed of the door if the gravitational force assists the motion of the door. To eliminate such a problem, the control unit may supply braking pulses as well as driving pulses to the motor depending on the direction of the gravitational force acting on the door, and assign a somewhat smaller duty ratio for the braking pulses than for the driving pulses for each given speed deviation as shown in FIG. 13. When there is no speed deviation, the duty ratio is zero, The braking duty ratio is assigned when the actual speed is higher than the target speed, and the driving duty ratio is assigned when the actual speed is lower than the target speed. In such a case, the control process for detecting an obstacle for the door is required to be adapted for the case where the braking duty ratio is being assigned, instead of the driving duty ratio. When the braking duty ratio is being assigned, the speed of the door typically progressively diminishes, and the period of the rotational pulses gets progressively longer. Therefore, the control process for detecting an obstacle could confuse the reduction in the speed of the door due to the braking pulses for that due to the obstacle for the door.

BRIEF SUMMARY OF THE INVENTION

In view of such problems of the prior art, a primary object of the present invention is to provide a method for controlling sliding doors which can actuate a door at a proper speed under any condition while providing means for detecting an obstacle for the door with a high level of reliability.

A second object of the present invention is to provide a method for controlling sliding doors which can favorably control the speed of a sliding door with a simple arrangement.

A third object of the present invention is to provide a method for controlling sliding doors which can actuate a door at a proper speed under any condition without interfering with the process of detecting an obstacle for the motion of the door.

A fourth object of the present invention is to provide a method for controlling sliding doors which allows accurate detection of an obstacle for a door even when the speed of the door is programmed to change during its course of operation.

A fifth object of the present invention is to provide a method for controlling sliding doors which allows accurate detection of an obstacle for a door even when the load acting on the door is changed by an assisting or resisting manual intervention during its course of operation.

A sixth object of the present invention is to provide a method for controlling sliding doors which allows a sliding door to be moved at a fixed speed under all load conditions even when the door is highly massive.

A seventh object of the present invention is to provide a method for controlling sliding doors which allows accurate detection of an obstacle for a door even when the control unit provides both driving and braking pulses depending on the load condition of the door.

According to the present invention, these and other objects can be accomplished by providing a method for controlling a powered sliding door system including a motor, a control unit for controlling the motor, a sliding door guided along a substantially linear path, and a power transmission unit for converting an output power of the motor to a sliding motion of the door, comprising the steps of: defining a standard operating parameter associated with a motion of the door under a standard condition of the door when the motor is actuated under a standard operating condition; measuring an actual operating parameter associated with a motion of the door under an existing condition of the door when the motor is actuated under a standard operating condition in an early interval of the motion of the door; computing a measure of a load acting on the door by comparing the actual operating parameter with the standard operating parameter; and determining a drive parameter for controlling the motor so as to move the door at a prescribed speed irrespective of the load acting on the door.

Thus, the speed of the motor can be controlled without relying on the feedback control which tends to interfere with the process of detecting an obstacle in the path of the motion of the sliding door. In a powered sliding door, detection of an obstacle is highly essential. To eliminate the need for a special sensor for detecting the position of the door, the rotation or the angular position of the motor may be detected, for instance, by using a rotary encoder associated with the motor. Thus, the arrangement for the sensor can be simplified. The operating parameter may consist of a calibration time period for the door to pass a calibration interval which is typically defined in a linear part of a guide rail for the sliding door adjacent to an end corresponding to the fully open position of the door, but outside the influences of a door checker normally provided in this part of the guide rail. Alternatively, the operating parameter may consist of a count of drive pulses supplied to the motor during a predetermined calibration time interval. According to yet another embodiment of the present invention, the operating parameter is given as a count of drive pulses supplied to the motor during the time the door passes a calibration interval under a feedback control.

In this conjunction, the load on the door should be considered in a relative sensor. The reduction in the power output of the motor, for instance, due to the use of the motor over a long period of time or other causes of the decline in the performance of the motor should be also considered as a form of increase in the load on the door. As can be readily appreciated by a person skilled in the art, the present invention is effective in maintaining a fixed schedule of speed for the door even under such a circumstance.

Even when the sliding door is controlled according to a predetermined schedule so that the process of detecting an obstacle in the path of the motion of the sliding door may be executed without any interference from the speed control, it is sometimes desirable to use a certain amount of feedback control. It is particularly the case when the speed control involves a calibration process at the beginning of each operation as mentioned above because the load on the door may change during the course of the operation of the door. The causes for such changes may include manual intervention in the motion of the door, and the curvature of the door when the vehicle is parked on a laterally slanted road surface. In such a case, the control process may include the steps of: defining a schedule of target speed for the sliding motion of the door; measuring an actual sliding speed of the door; computing a deviation of the actual sliding speed from the target speed; and adjusting a duty ratio of the drive signal for the motor at a prescribed increment so as to offset the deviation at a timing which depends on the magnitude of the deviation or the position of the door. In the latter case, the timing may be progressively reduced as the door approaches its fully closed position.

Thus, the control process preferably involves a certain mode of feedback control which however uses the timing for incrementing the duty ratio instead of changing the duty ratio in direct response to the deviation in speed. Therefore, it is possible to obtain the benefits of feedback control without substantially affecting the performance of the process for detecting an obstacle in the path of the motion of the sliding door. Typically, the timing is measured either by clock pulses or by the count of the pulses indicative of the position of the door or the motor.

The presence of an obstacle in the path of the motion of a sliding door may be detected by the method comprising the steps of: measuring the speed of the motor at a prescribed cycle; comparing the speed of the motor at the current cycle with a modified speed of the motor of the previous cycle which is given as a sum of the speed of the motor of the previous cycle and a prescribed tolerance value; and detecting an obstacle for the door when the speed of the motor at the current cycle continues to be smaller than the modified speed of the motor of the previous cycle for a prescribed number of cycles. This method could however produce an erroneous result if there is a reduction in the speed of the door due to other causes than an obstacle in the path of the motion of the sliding door. For instance, the schedule of standard speed may include an interval of speed reduction. In such a case, an erroneous detection may be avoided by increasing the tolerance value from a normal value.

When the door is massive, and the gravitation force acting thereon assists the motion of the door, reducing the duty ratio of the drive pulses may not be adequate for controlling the speed of the door. In such a case, the operating parameter may be given as a ratio of counts of drive pulses and brake pulses supplied to the motor during the time the door passes a calibration interval under a feedback control, or, alternatively, as a ratio of duty time periods of drive pulses and brake pulses supplied to the motor during the time the door passes a calibration interval under a feedback control.

Also, in such a case, in the process for detecting an obstacle in the path of the motion of a sliding door, to avoid an erroneous detection result, the tolerance value may be increased from a normal value when the control unit is supplying brake pulses to the motor.

BRIEF DESCRIPTION OF THE DRAWINGS

Now the present invention is described in the following with reference to the appended drawings, in which:

FIG. 3 is a time chart showing a certain aspect of the process for detecting an obstacle for the sliding door;

FIG. 5 is a time chart similar to FIG. 3 showing the control process for detecting an obstacle for the sliding door which can properly take into account the scheduled changes in the speed of the sliding door;

FIG. 11 is a graph showing the time history of the sliding speed and the driving duty ratio during the closing motion thereof from its fully closed state when the sliding door receives an assisting manual intervention while in the calibration region;

FIG. 12 is a graph similar to FIG. 11 when the sliding door is closed from its half open state, and an assisting manual intervention is applied at the beginning of the closing motion;

DETAILED DESCRIPTION OF THE PREFERRED EMBODIMENTS

Figure 1:
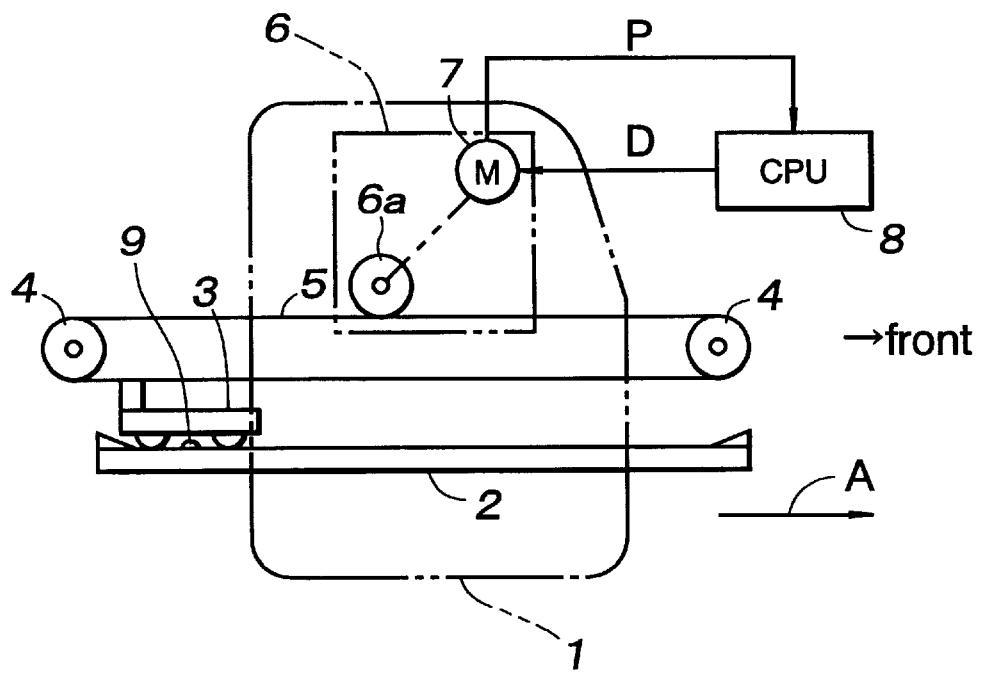
FIG. 1 is a diagrammatic view of an automotive sliding door system to which the present invention is applied.

FIG. 1 is a diagrammatic view of an automotive sliding door system to which the present invention is applied. Referring to FIG. 1, a motor vehicle is provided with a sliding door 1 which can slide in the fore-and-aft direction to allow access to the rear seat. The sliding door 1 is supported and guided at upper and lower ends by rails extending along the upper and lower door sashes (not shown in the drawing), and at a rear end by a guide rail 2 extending along a side of the vehicle body via a slider 3. The slider 3 is attached to a middle part of a length of wire 5 having two ends which are passed around a pair of pulleys 4 provided at either end of the guide rail 2. The right hand side of FIG. 1 corresponds to a front end of the vehicle body.

The two ends of the wire 5 are wound, in mutually opposite directions, around a drive drum 6a provided inside a casing of a drive unit 6, and the drive drum 6a is in turn rotatively actuated by an electric motor 7 also provided inside the casing of the drive unit 6. The drive drum 6a thus turns in either direction depending on the rotational direction of the motor 7, and the wire 5 can be linearly driven in either desired direction. The linear motion of the wire 5 in turn causes the sliding motion of the door 1 in the fore-and-aft direction while the slider 3 is guided by the guide rail 2.

The automotive sliding door system additionally comprises a motor control unit 8 for controlling the motion of the motor 7. A rotational pulse signal P from a rotary encoder (not shown in the drawing) associated with the motor 7 is forwarded to the motor control unit 8 which in turn produces a reversible drive pulse signal D based on a duty ratio control for the motor 7 so that the motor 7 may be operated at a desired speed in either rotational direction. In FIG. 1, the sliding door 1 is in a fully open state, and can be closed by moving the door in the forward direction as indicated by an arrow A. In the following is described the control process according to the present invention when closing the door.

Figure 2:
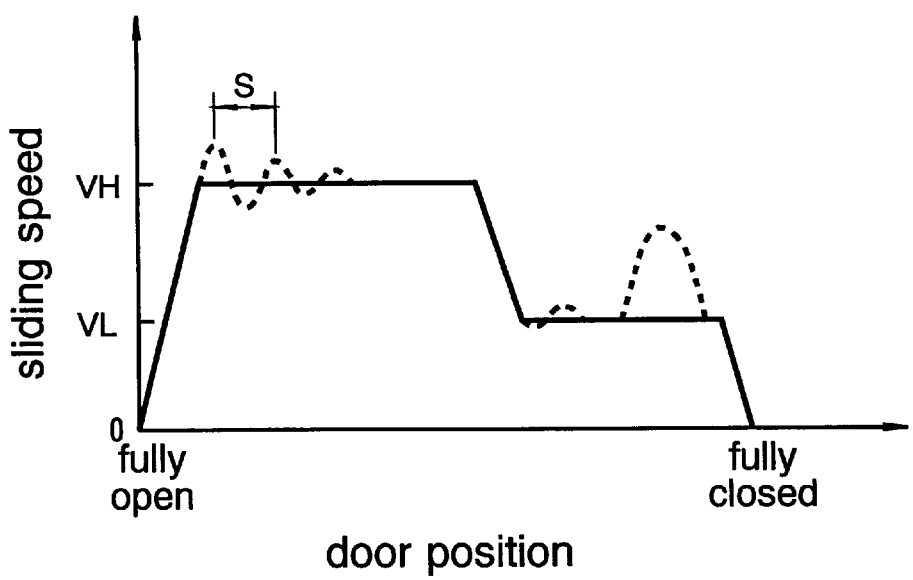
FIG. 2 is a time chart showing the change in the speed of the sliding door with the position of the door.

FIG. 2 shows the target speed of the sliding door in relation with the position of the door. The door is initially moved at a high speed VH (240 mm/sec, for instance), and the speed is reduced to a low speed VL (100 mm/sec, for instance) when the door reaches a certain point which is short of the fully closed position by a certain distance (100 mm, for instance). The ratio of the intervals of the high speed and low speed shown in FIG. 2 does not correspond to the actual ratio for the clarity of illustration. In FIG. 2, the solid line indicates the target value, and the actual speed is indicated by the dotted line. The motor control is based on the PWM control process as mentioned earlier. The position of the door for reducing the speed can be determined from the count of the rotational pulse signal P from the motor 7.

The process of detecting an obstacle in the path of the motion of the door is described in the following with reference to FIG. 3. This detection process takes place at a prescribed timing based on the rotational pulse signal of the motor 7 (for instance, at the falling edge of each rotational pulse). For instance, the time period of one revolution (which corresponds to 20 rotational pulses) is computed at each rotational pulse, and the change in this time period is monitored. In this embodiment, the time period of two pulses preceding the falling edge of the current pulse is computed as a base time period Td which is multiplied by 10 to obtain a current time period Tr for one revolution of the motor as shown in FIG. 3. Similarly, the time period of two pulses preceding the falling edge of the previous pulse is computed as a base time period Td' which is multiplied by 10 to obtain a preceding time period Tp for one revolution of the motor. When the door encounters any obstacle, the time period for one revolution increases.

Referring to FIG. 3, the preceding time period Tp is stored in memory for comparison with the current time period Tr. To allow for some error, a tolerance value ΔT is added to the preceding time period Tp to obtain a modified preceding time period Tq (=Tp+ΔT). When the current time period Tr for one revolution exceeds the modified preceding time period Tq for three consecutive rotational pulses, it is then determined that the door has encountered an obstacle. The tolerance value ΔT may not be a fixed value, but may be computed for each rotational pulse as described hereinafter.

Figure 4:
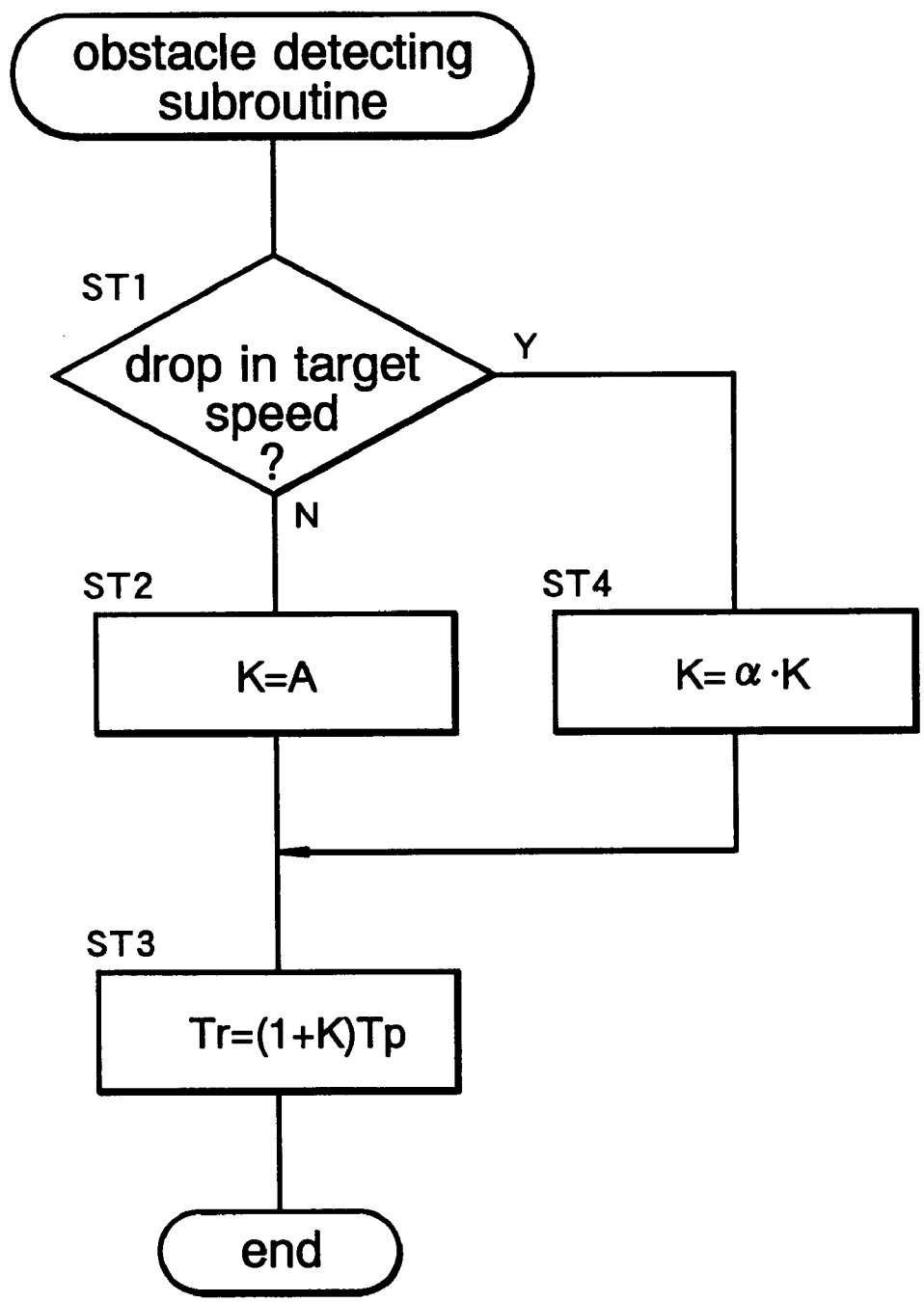
FIG. 4 is a flow chart showing the process for detecting an obstacle for the sliding door.

The control flow for the process of detecting an obstacle in the path of the motion of the door is described in the following with reference to FIG. 4. In step ST1, it is determined if the target speed of the door has been reduced from the high speed VH to the low speed VL. The timing and rate of the reduction in the target speed is programmed as shown in FIG. 2, and the control unit 8 monitors the rate of speed reduction to accurately identify the current position on the graph of FIG. 2. In this case, the change in the speed is programmed so as to occur linearly.

In the intervals of constant speed either at the high speed or the low speed, the target speed is fixed. If it is identified that the door is inside the interval of constant speed, the program flow advances to step ST2 where a coefficient K is selected as a certain constant value A which is smaller than one. This constant value may consist of either a single constant value or two different constant values depending on whether the door is in the interval of high speed or low speed. Then, in step ST3, the modified preceding time period Tq is computed from the following equation.

$$Tq=(1+K)\times Tp \qquad (1)$$

If it is determined that the target speed of the door is dropping in step ST1, the program flow advances to step ST4. In this case, a factor α which is larger than one is multiplied to the current value of K to produce a new value of K which is then used in step ST4. By thus increasing the value of the modified preceding time period Tq, (which means an under-evaluation of the speed of the door in the previous cycle), confusion of the schedule speed reduction for a speed reduction as a result of the door encountering an obstacle can be avoided.

This is illustrated in the time chart of FIG. 5. The upper part of the time chart shows a determination process based on the comparison of the current time period Tr with the modified preceding time period Tq which is given as a sum of the preceding time period Tp and the tolerance value ΔT (=K×Tp) when the door is moving at a constant speed. In this case, Tq>Tr or there is no appreciable reduction in the speed of the door, and it can be therefore concluded that the door is not encountering any obstacle. If the same control process is applied even though the door is in the middle of the scheduled speed reduction, an error could be made in detecting the presence of an obstacle for the door. This is shown in the lower part of the time chart. The scheduled reduction in the speed of the door increases the current time period Tr possibly beyond the modified preceding time period Tq' which is defined without taking into account the scheduled speed reduction as indicated by the dotted line in the lower part of the time chart. However, according to the present invention, the modified preceding time period Tq is increased from the normal value during the scheduled speed reduction, by using the factor a which is larger than one, as indicated by the solid line in the lower part of the time chart. Therefore, when there is an increase in the current time period Tr due to the scheduled speed reduction of the door, the simultaneous increase in the reference time period or the modified preceding time period Tq offsets this increase (Tq>Tr) so that the possibility of erroneously detecting an obstacle for the door due to the apparent reduction in the speed of the door can be minimized.

When an obstacle is detected in the path of the motion of the door, the motion of the door is typically reversed. The response to the detection of an obstacle is not a part of the present invention, and may be selected from any known arrangement.

The process of computing the duty ratio for the PWM control is described in the following with reference to FIGS. 6 and 7. According to this embodiment, the load acting on the door is determined in an early part of the operation of the door by measuring the time period for the door to pass a prescribed calibration interval S under a fixed standard duty ratio condition. A larger load on the door means an increase in the time period for the door to pass this calibration interval S. Based on the knowledge of the load on the door thus obtained, the duty ratio for the motor control for the subsequent operation is determined so that the door may move at a prescribed speed which does not depend on the load on the door.

In this embodiment, this calibration interval S is selected as close to the fully open position as possible but in a region where the speed of the door has fully reached the initial high speed VH, preferably, as a steady state value. It should be noted that the detection of the calibration interval S may not be based on the direct measurement of the position of the door 1 but may be based on the count of the rotational pulse signal P obtained from the motor 7. A calibration time period Th is actually measured as a time period for counting a prescribed number of rotational pulses of the motor 7 or for a certain number of revolutions of the motor (or an angle less than 360 degrees in the motion of the motor) that is required for the door to pass the calibration interval S. In other words, no position sensor for the door is required for detecting the calibration interval S.

An automotive sliding door is normally provided with a door checker 9 at a suitable location for retaining the door at its fully open position see (FIG. 1). The door checker 9 typically consists of a projection which produces a certain resistance to the motion of the door 1 as the slider 3 rides over this projection. The presence of the door checker 9 causes a certain disturbance to the measurement of the speed of the door 1 or the measurement of the time period for counting the rotational pulses. In this case, the interval S is selected in a linear section of the guide rail 3 which is somewhat displaced on the closing side of the projection to avoid such a disturbance. The pulse count is zero when the door is fully open, and the actual count may begin only after the door has ridden over the projection, and has reached this linear section of the guide rail 2. In this case, a certain predetermined preparatory count is made to indicate that the door has safely passed the projection before the actual count begins. This allows an accurate measurement of the reference time period without requiring any sensor for directly detecting the actual position of the sliding door.

The vehicle may not be always parked on a horizontal road surface, but may also be parked on a downhill or uphill road surface. When the vehicle is parked on an uphill road surface, and an attempt is made to close the sliding door by moving it forward, the gravitational force acting on the door opposes the force for closing the door. Thus, the duty ratio d of the motor PWM control that is required for maintaining a constant standard traveling speed of the door is required to be adjusted depending on the inclination of the road surface and other factors that affect the load acting on the door.

Figure 6:
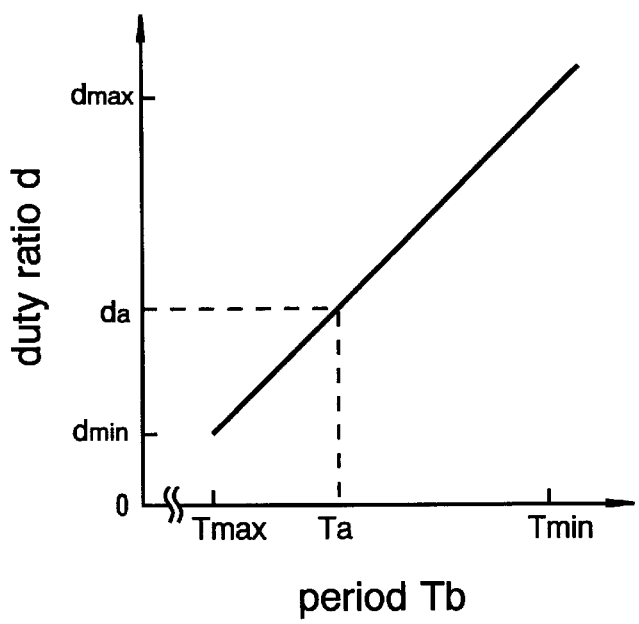
FIG. 6 is a graph showing the relationship between the period of the rotational pulses detected in the calibration region and the drive pulse duty ratio that is required for achieving a target speed in the remaining part of the operating region.

FIG. 6 graphically shows this relationship. The solid straight line in this graph passes through an intersection of a standard period Ta for a target standard speed and a standard duty ratio d that is required to achieve this constant speed on a horizontal road surface. The period is measured as a time duration for counting twenty rotational pulses or the number of pulses which are produced as the door passes the calibration interval S under the fixed standard duty ratio condition. Because the load for moving the door depends on the inclination of the road surface, the actually measured period would change depending on the inclination of the road surface. Suppose that the time periods for the door to pass the calibration interval S under the maximum and minimum conceivable levels of load on the door when the duty ratio is at the standard duty ratio are given by $T_{max}$ and $T_{min}$, respectively. The duty ratios that are required to move the door at the standard constant speed under these maximum and minimum load levels are either computed or actually measured, and are obtained as $d_{max}$ and $d_{min}$, respectively. Then, assuming a linear relationship between the duty ratio and the output power of the motor, the straight line connecting the coordinates ($d_{min}$, $T_{min}$) and ($d_{max}$, $T_{max}$) gives the duty ratio that is required to maintain the standard constant speed under any intermediate load condition, including the standard duty ratio under the standard load (da, Ta), as shown in FIG. 6.

Figure 7:
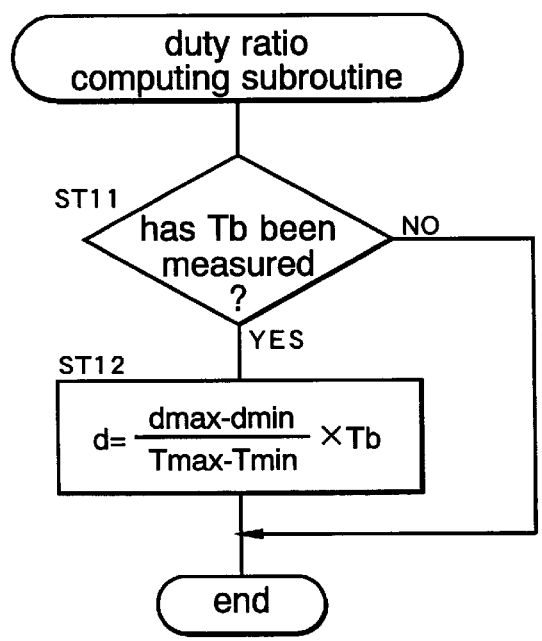
FIG. 7 is a flow chart showing the control process for ensuring a fixed speed of motion for the sliding door without regard to the load acting on the door.

FIG. 7 shows a flow chart of the control process for determine the duty ratio for maintaining the standard speed of the door under any load condition. In step ST11, it is determined if a measurement of the calibration time period Tb has been completed or not. If it is determined that the measurement of Tb has not been completed in step ST1, the current subroutine is ended, and this subroutine is resumed upon the next escape sequence. If it is determined that the measurement of Tb has been completed in step ST1, the program flow advances to step ST2. In step ST2, the duty ratio is computed according to the following equation.

$$d=T_b \times (d_{max}-d_{min})/(T_{max}-T_{min}) \qquad (2)$$

The calibration time period Tb is computed from the time period for the door to pass through the prescribed interval S near the fully open position as mentioned earlier.

Thus, according to this arrangement, the proper power output or the duty ratio of the motor can be determined during a brief time period immediately following the start of the operation of the door, and the power output of the motor is maintained a proper level for achieving the target speed under the given condition during the rest of the operation of the door. This simplifies the control arrangement because the control unit requires only a rotary encoder and a clock for measuring the state of the door, and the control process consists of a simple table look-up or other map control, instead of a more complex servo control. More importantly, this control process would not interfere with the control process for detecting an obstacle of the door.

In the above described embodiment, the load acting on the door was estimated from the time period for the door to pass the calibration interval S, and the calibration interval S was given as a number of counts of a rotary encoder associated with the motor. Therefore, the duty ratio control allows a compensation for the change in the load irrespective of the cause of the change in the load. The load on the door may be affected by the change in the frictional surfaces, temperature changes, and the period of use as well as by the inclination of the road surface.

Once the sliding door has passed the calibration interval, the sliding door may be allowed to move according to a programmed duty ratio schedule. However, the load on the sliding door may change during the course of its motion, and it is preferable to introduce some compensatory control action so that the sliding door may continue the scheduled speed pattern even when the vehicle door experiences a change in the load (which may either assist or resist the motion of the door) after it has passed through the calibration interval S. This control action is now described in the following for different sources of changes in the load.

Figure 8:
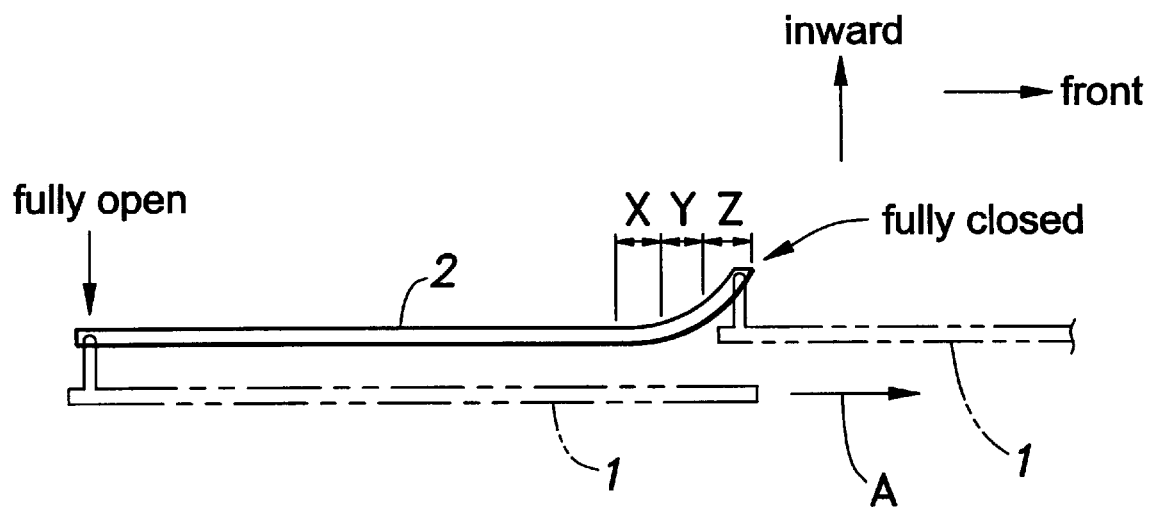
FIG. 8 is a diagrammatic view showing a sliding door guide rail having a curved end.
Figure 9:
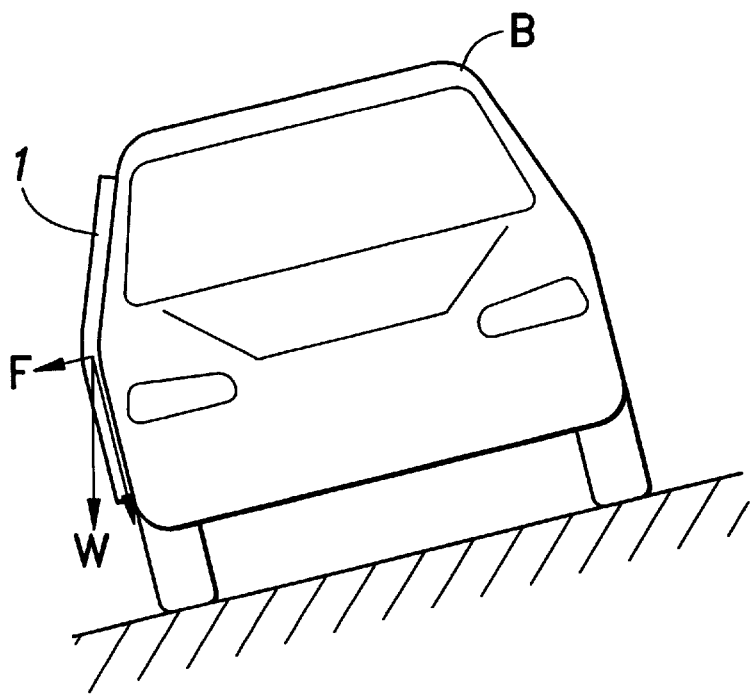
FIG. 9 is a front view of a motor vehicle on a laterally slanted road surface.

The embodiment which is about to be described takes into account the fact that the guide rail 2 curves inward towards the end corresponding to the fully closed position of the door as illustrated in FIG. 8. By thus curving the guide rail 2 at the front end thereof, the door 1 can be made flush with the side contour of the vehicle body when the door is fully closed. Suppose that the vehicle is parked on a road surface which is slanted sideways causing the vehicle body B to tilt toward one side thereof as illustrated in FIG. 9. Thus, the sliding door 1 on this side experiences a laterally outwardly directed force F which is given as a component of the gravitational force W acting on the door 1. Therefore, as the door approaches the fully closed position by passing the sections X, Y and Z, and moves inward, the door is subjected to the force F which opposes the motion of the door to move along this curved part of the guide rail 2. The resulting increase in the load acting on the door could be confused as being caused by an inadvertent obstacle to the movement of the door. The curvature of the guide rail 2 typically progressively increases as the door passes the sections X, Y and Z, in that order.

Figure 10:
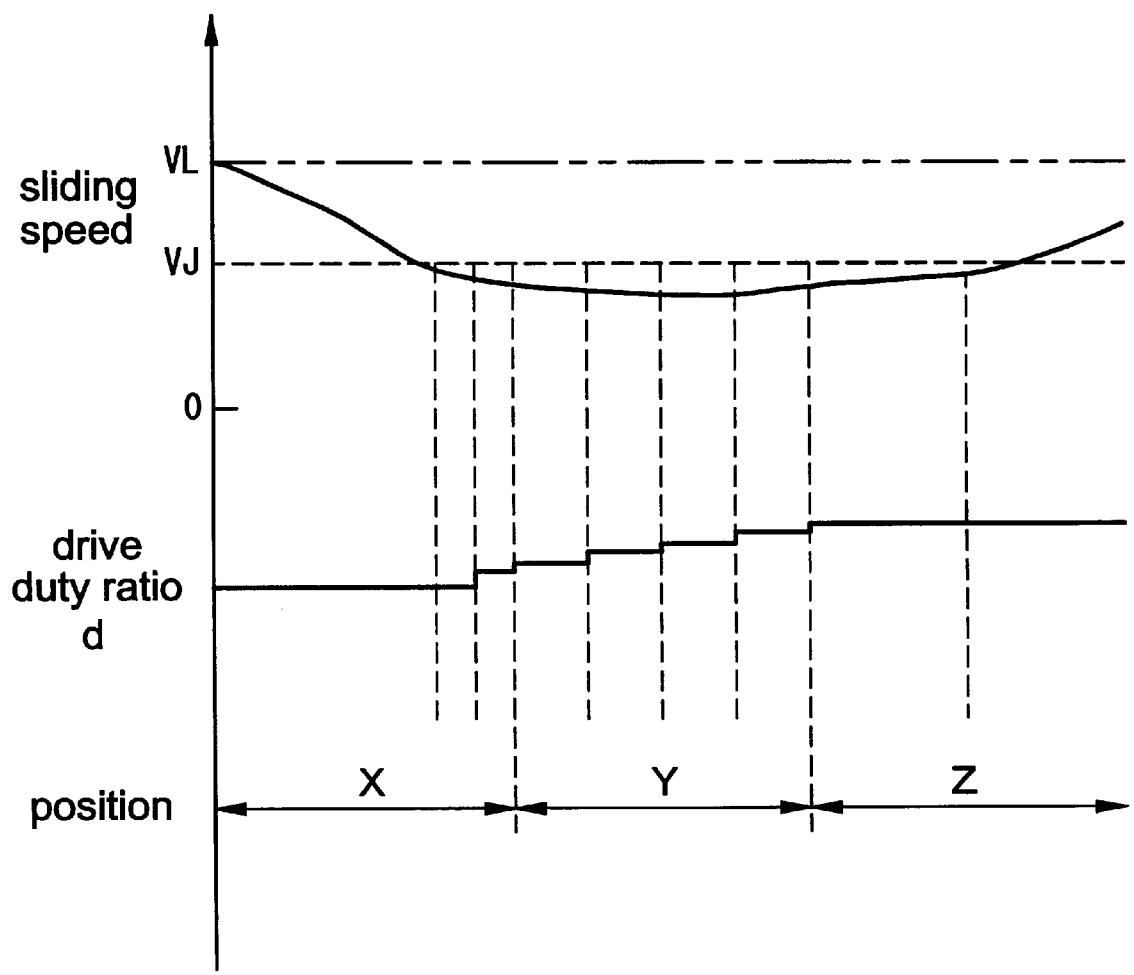
FIG. 10 is a graph showing the changes in the sliding speed and the drive duty ratio in relation with the position of the door in the curved section of the guide rail.

The control process is now described in the following with reference to the graph shown in FIG. 10. The ordinate of this graph corresponds to the position on the guide rail 2 in the sections X, Y and Z, and the abscissa indicates the speed of the sliding door 1 and the drive duty ratio. As the door moves into the section X, the load due to the force F starts acting on the door, and the sliding speed of the door diminishes. When the sliding speed falls below a threshold speed level VJ which is lower than the target level VL by a certain value, the rotational pulses are counted. When the count reaches a predetermined number, the drive duty ratio d is increased by a certain increment which may be relatively small (2%, for instance). For instance, if the period of each rotational pulse is 7 to 8 ms, the count of the rotational pulses before incrementing the duty ratio may be 10 in the section X, 20 in the section Y and 40 in the section Z.

The duty ratio is increased in small increments (2%) because the increase in the load on the door due to the tilting of the vehicle body is substantially smaller than that caused by an obstacle for the door, and it is important to distinguish the two causes for the increase in the load on the door. If the increase in the load on the door is caused by the lateral tilting of the vehicle body B, it is possible to regain the target speed VL simply by gradually increasing the duty ratio of the drive pulses. On the other hand, if the increase in the load on the door is caused by an obstacle for the door, the drop in the speed of the door is more rapid, and the load tends to progressively increase. Therefore, it is desirable to avoid any rapid increase in the drive duty ratio which could cause the door to be excessively pressed onto the obstacle.

The condition for increasing the duty ratio is progressively more rigorous as the curvature of the guide rail increases, and the load on the door thereby increases. This is due to the consideration that the need for avoiding the confusion between the two causes becomes progressively acute as the door approaches its fully closed position.

If the slide speed regains the threshold speed VJ by gradually increasing the duty ratio of the drive pulses, the rotational pulse count is cleared. When the speed of the door falls below the threshold speed VJ again, the count of the rotational pulses is resumed.

The sliding door is often adapted to be activated by a switch incorporated in the door handle so that the user's natural effort to either open or close the door by the door handle causes this switch to be activated in the corresponding sense. Such an arrangement may be provided in combination with a fully powered operation of the door which is typically initiated by operating a switch placed in a fixed part of the vehicle body within the reach of the vehicle operator or other vehicle occupant. In the following is described the process for distinguishing the change in the load acting on the door due to the manual intervention.

FIG. 11 shows a time chart depicting the case where the door is closed from its fully open position with an assisting manual intervention being applied over a region M. This region M includes the calibration interval S so that the duty ratio control system determines a duty ratio which is based on an underestimation of the load acting on the door. Therefore, when the door moves out of the calibration interval S with this assisting force removed, the selected duty ratio is not adequate for moving the door at the prescribed high speed VH, and the speed of the door drops sharply as indicated in the time chart.

According to this embodiment, upon detection of the deviation $\Delta V$ from the target high speed VH, the control unit increases the duty ratio by a small increment of 2%, for example, so as to reduce this deviation. Although the increment in the increase of the duty ratio is fixed, the timing of incrementing the duty ratio is dependent on the magnitude of the deviation $\Delta V$. In this case, the greater the deviation is, the sooner the incrementing of the duty ratio occurs. This timing may be given as a number of clock pulses or rotational pulses. In either case, the magnitude of the deviation may be made inversely proportional to the number of pulse count that is required for the incrementing the duty ratio to take place. Thus, the tendency to regain the target high speed is amplified as the deviation $\Delta V$ becomes larger.

The duty ratio is increased in small increments (2%) because the increase in the load on the door due to the initial assisting manual intervention is substantially smaller than that caused by an obstacle for the door, and it is important to distinguish the two causes for the increase in the load on the door. If the increase in the load on the door is caused by the removal of the initial assisting manual intervention, it is possible to regain the target speed VH simply by gradually increasing the duty ratio of the drive pulses. On the other hand, if the increase in the load on the door is caused by an obstacle for the door, the drop in the speed of the door is more rapid, and the load tends to progressively increase. Therefore, it is desirable to avoid any rapid increase in the drive duty ratio which could cause an undesired rapid increase in the drive force for the door.

FIG. 12 shows the operation of this embodiment when the door is closed from its half open state. During the time the door is assisted by manual intervention (region M), the duty ratio is gradually reduced so as to control the speed of the door at the prescribed high speed VH. Once the manual intervention is removed, the speed of the door drops sharply. This in turn causes a gradual increase in the duty ratio. In this case also, the magnitude of the deviation is made inversely proportional to the number of pulse count that is required for the incrementing the duty ratio to take place so that the tendency to regain the target high speed is amplified as the deviation $\Delta V$ becomes larger.

The compensatory control action may be executed without regard to the source of the change in the load on the door as can be readily appreciated by a person skilled in the art.

The present invention has been described with regard to the closing of the door, but can be identically or similarly applied to the case of opening the door. However, it is also possible to simplify the control action when opening the door because the door would not encounter any obstacle during its course of operation, as opposed to the case of closing the door.

According to a modified embodiment of the present invention, the estimation of the load on the door may be based on the number of rotational pulses which are produced from the motor while the sliding door is powered by drive pulses of a standard duty ratio in a prescribed time period. In this case also, the interval (calibration time interval) for this measurement is defined at a small distance (or a small time interval) away from the fully open position to avoid any source of disturbances to the measurement such as a door checker. The ratio of the actual number of rotational pulses that are counted in the calibration time interval to the standard number of rotational pulses that would be counted in the calibration time interval when the vehicle is parked on a horizontal road surface gives a measure of the magnitude of the load acting on the door. Based on the load acting on the door thus obtained, the duty ratio for the remaining operation of the motor can be determined. In this case also, the duty ratio control would not interfere with the control process for detecting an obstacle for the door.

According to another embodiment of the present invention, the estimation of the load on the door may be based on the number of drive pulses which are required to be supplied to the motor for the door to pass the calibration interval S under a feedback speed control for achieving a standard speed (200 mm/sec, for instance). The ratio of the actual number of drive pulses that are counted while the door passes the calibration interval S to the standard number of drive pulses that would be counted while the door passes the calibration interval S on a horizontal road surface gives a measure of the magnitude of the load acting on the door. Based on the load acting on the door thus obtained, the duty ratio for the remaining operation of the motor can be determined. As can be readily appreciated, when the vehicle is parked on an uphill road surface, a larger number of drive pulses would be necessary for the door to pass the calibration interval S, and vice versa. In this case also, the duty ratio control would not interfere with the control process for detecting an obstacle for the door. The calibration interval S can be determined in the same way as in the previous embodiment.

Figure 13:
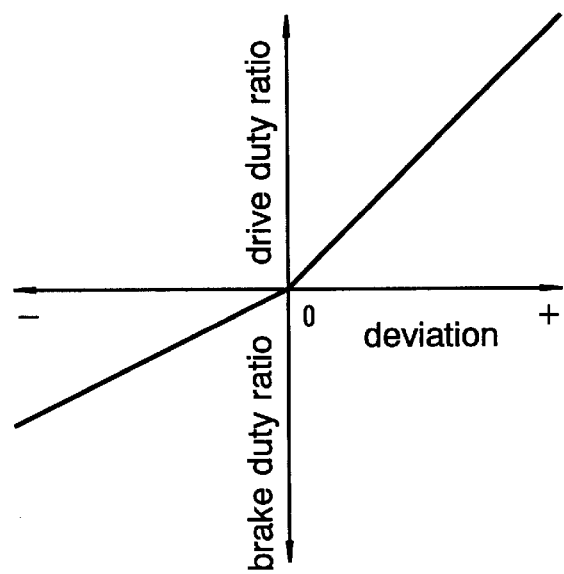
FIG. 13 is a graph showing the magnitude of the driving and braking duty ratio in relation with the deviation of the speed of the sliding door from the target value.

When the gravitational force assists the motion of the door, and the sliding door is massive, reducing the drive force of the motor may not be adequate to control the speed of the door. To eliminate such a problem, the control unit may supply braking pulses as well as driving pulses to the motor, and assign a somewhat smaller duty ratio for the braking pulses than for the driving pulses for each given speed deviation as shown in FIG. 13. In the following is described a control process which allows detection of an obstacle for the door in such an arrangement with a high level of reliability.

Figure 14:
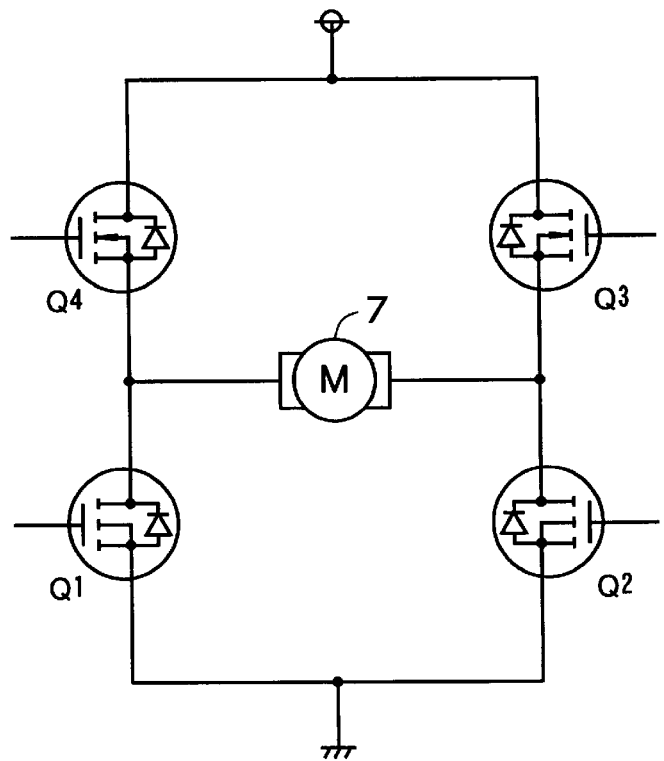
FIG. 14 is a circuit diagram of the motor drive circuit.

FIG. 14 shows a motor drive circuit for reversibly controlling a motor by using a four-arm FET bridge circuit including four FETs (Q1 to Q4). Q1 and Q3 are turned on when the motor is driven in the normal direction, and Q2 and Q4 are turned on when the motor is driven in the reverse direction. Q1 and Q2 are turned on when the motor is braked. In each case, the duty ratio of the braking or driving pulses are adjusted so that a desired driving force or braking force may be obtained.

In such a case, a measure of the load acting on the door can be determined from the ratio of the braking control to the driving control. More specifically, the ratio of the number of braking pulses to the number of driving pulses is computed when a feedback control is executed to maintain the standard speed of the door while the door passes through the calibration interval S. When the door is subjected to a load which is greater than the standard level or the vehicle is parking on an uphill road surface, the driving pulses increase in number while the braking pulses decrease in number, and vice versa.

According to a modified embodiment of present invention, the ratio of the braking control to the driving control may also be given as a ratio of the total duty time of the driving pulses to the total duty time of the braking pulses when a feedback control is executed to maintain the standard speed of the door while the door passes through the calibration interval S. In this case, if desired, the driving pulse duty time may be progressively increased, in an early part of the feedback control, until the initial high speed target value (250 mm/sec, for instance) is reached, and the duty ratios of the braking pulses and the driving pulses after reaching a steady state may be used as a basis of computing the ratio.

Figure 15:
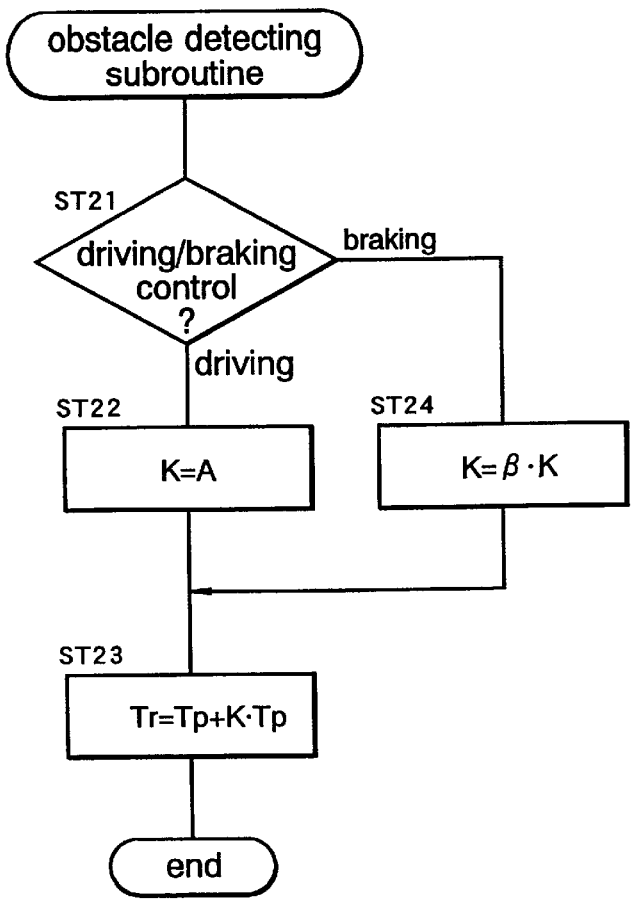
FIG. 15 is a flow chart similar to FIG. 4 showing another aspect of the process for detecting an obstacle for the sliding door.

FIG. 15 is a flow chart of the control process for detecting an obstacle for the door according to the present invention. In step ST21, it is determined which of the control modes, the braking mode or the driving mode, is in progress. It can be determined from the combination of the states of the FETs (Q1 to Q4). If it is determined that the driving control is in progress in step ST21, the program flow advances to step ST22 where a coefficient K is selected as a certain constant value A which is smaller than one. Then, in step ST23, the modified preceding time period Tq is computed from the following equation.

$$Tq = (1+K) \times Tp \tag{3}$$

Figure 16:
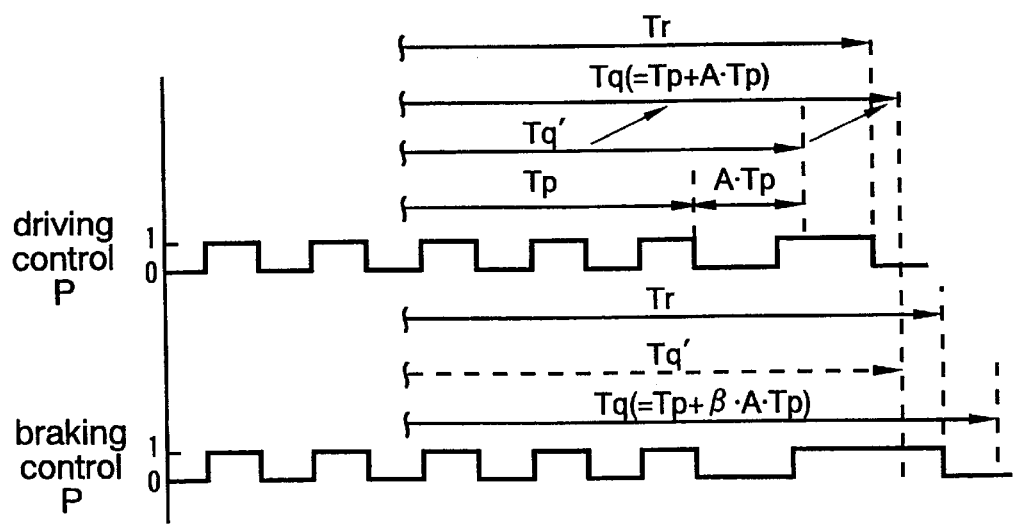
FIG. 16 is a time chart similar to FIG. 3 showing the control process for detecting an obstacle for the sliding door which can properly distinguish between the driving and braking control of the motor.

The upper part of the time chart in FIG. 16 shows a case where an absence of an obstacle for the door has been detected during the driving control (Tr<Tq).

If it is determined that the braking control is in progress in step ST21, the program flow advances to step ST24. In this case, a factor β which is larger than one is multiplied to the current value of K to produce a new value of K which is then used in step SM24. By thus increasing the value of the modified preceding time period Tq, (which means an under-evaluation of the speed of the door in the previous cycle), the possibility of confusing a speed reduction due to the braking control for a speed reduction produced as a result of the door encountering an obstacle can be avoided. This is illustrated in the lower part of the time chart of FIG. 16. If the normal tolerance value ΔT (=K×Tp) is used or the modified preceding time period Tq is given as indicated by the dotted line in the lower part of the graph, because Tr>Tq, the control system would erroneously indicate that there is an obstacle for the door. However, according to this embodiment, because the braking control is in progress, an amplified tolerance value ΔT is used so that Tr<Tq, and the absence of an obstacle for the door can be correctly detected. Thus, the speed reduction due to the execution of the braking control is prevented from being confused for a case of an obstacle to the motion of the door.

Although the present invention has been described in terms of preferred embodiments thereof, it is obvious to a person skilled in the art that various alterations and modifications are possible without departing from the scope of the present invention which is set forth in the appended claims.

What is claimed is:

1. A method for controlling a powered sliding door system including a motor, a control unit for controlling said motor, a sliding door guided along a substantially linear path, and a power transmission unit for converting an output power of said motor to a sliding motion of said door, comprising the steps of:
   defining a standard operating parameter associated with a motion of said door under a standard condition of said door when said motor is actuated under a standard operating condition;
   measuring an actual operating parameter associated with a motion of said door under an existing condition of said door when said motor is actuated under a standard operating condition in an early interval of the motion of said door;
   computing a measure of a load acting on said door by comparing the actual operating parameter with the standard operating parameter; and
   determining a drive parameter for controlling said motor so as to move said door at a prescribed speed irrespective of the load acting said the door.

2. A method for controlling a powered sliding door system according to claim 1, wherein said operating parameter is given as a calibration time period for said door to pass a calibration interval.

3. A method for controlling a powered sliding door system according to claim 2, wherein said actual calibration interval is measured from a pulse count of a rotary encoder associated with said motor.

4. A method for controlling a powered sliding door system according to claim 1, wherein said actual operating parameter is given as a count of drive pulses supplied to said motor during a predetermined calibration time interval.

5. A method for controlling a powered sliding door system according to claim 1, wherein said actual operating parameter is given as a count of drive pulses supplied to said motor during the time said door passes a calibration interval under a feedback control.

6. A method for controlling a powered sliding door system according to claim 1, wherein said actual operating parameter is given as a ratio of counts of drive pulses and brake pulses supplied to said motor during the time said door passes a calibration interval under a feedback control.

7. A method for controlling a powered sliding door system according to claim 1, wherein said actual operating parameter is given as a ratio of duty time periods of drive pulses and brake pulses supplied to said motor during the time said door passes a calibration interval under a feedback control.

8. A method for controlling a powered sliding door system including a motor, a control unit for controlling said motor, a sliding door guided along a substantially linear path, and a power transmission unit for converting an output power of said motor to a sliding motion of said door, comprising the steps of:
   defining a schedule of target speed for the sliding motion of said door;
   measuring an actual sliding speed of said door;
   computing a deviation of the actual sliding speed from said target speed; and
   adjusting a duty ratio of the drive signal for said motor at a prescribed increment so as to offset said deviation at a timing which depends on the magnitude of said deviation.

9. A method for controlling a powered sliding door system according to claim 8, wherein said timing is measured by clock pulses.

10. A method for controlling a powered sliding door system according to claim 8, wherein said timing is measured by pulses indicative of the position of said door.

11. A method for controlling a powered sliding door system including a motor, a control unit for controlling said motor, a sliding door guided along a substantially linear path, and a power transmission unit for converting an output power of said motor to a sliding motion of said door, comprising the steps of:

defining a schedule of target speed for the sliding motion of said door;

measuring an actual sliding speed of said door;

computing a deviation of the actual sliding speed from said target speed; and adjusting a duty ratio of the drive signal for said motor at a prescribed increment so as to offset said deviation at a timing which depends on the position of said door.

12. A method for controlling a powered sliding door system according to claim 11, wherein said timing is progressively reduced as said door approaches its fully closed position.

13. A method for controlling a powered sliding door system according to claim 12, wherein said timing is measured by pulses indicative of the position of said door.

14. A method for detecting an obstacle for a sliding door in a powered sliding door system including a motor, a control unit for controlling said motor according to a schedule of standard speed, a sliding door guided along a substantially linear path, and a power transmission unit for converting an output power of said motor to a sliding motion of said door, comprising the steps of:

measuring the speed of said motor at a prescribed cycle;

comparing the speed of said motor at a current cycle with a modified speed of said motor of the previous cycle which is given as a sum of the speed of said motor of a previous cycle and a prescribed tolerance value; and detecting an obstacle for said door when the speed of said motor at the current cycle continues to be smaller than the modified speed of said motor of the previous cycle for a prescribed number of cycles;

said tolerance value being adjusted depending on an operating parameter of said powered sliding door system during a course of a sliding motion of said door.

15. A method for detecting an obstacle according to claim 14, wherein said tolerance value is increased from a normal value during an interval where said schedule of standard speed prescribes a speed reduction.

16. A method for detecting an obstacle according to claim 14, wherein said control unit is adapted to supply both brake and drive pulses to said motor depending on an existing load condition for said door, and said tolerance value is increased from a normal value when said control unit is supplying brake pulses to said motor.

17. A method for detecting an obstacle according to claim 14, wherein said operating parameter is a detected operating parameter of the powered sliding door system.

18. A method for controlling a powered sliding door system according to claim 8, wherein said duty ratio of the drive signal for said motor is adjusted at a prescribed small increment sufficient to offset deviations due to causes other than obstacles in the substantially linear path of said door.

19. A method for controlling a powered sliding door system according to claim 11, wherein said duty ratio of the drive signal for said motor is adjusted at a prescribed small increment sufficient to offset deviations due to causes other than obstacles in the substantially linear path of said door.

20. A method for controlling a powered sliding door system according to claim 8, wherein said method may be initiated with said door at an intermediate position between end positions of said substantially linear path.

* * * * *

UNITED STATES PATENT AND TRADEMARK OFFICE
CERTIFICATE OF CORRECTION

PATENT NO. : 6,208,102 B1
DATED : March 27, 2001
INVENTOR(S) : Taizo Kikuchi, Kazunari Ochi, Toru Namiki, Tatsumi Sakazume, Hiroshi Ono, Masami Sayama It is certified that error appears in the above-identified patent and that said Letters Patent is hereby corrected as shown below:

Column 2,
Line 34, delete "the".

Column 7,
Line 59, change "factor a" to -- factor $\alpha$ --.

Column 8,
Line 8, before "6" insert -- 2, --;
Line 27, change "Th" to -- Tb --;
Line 36, change "see (FIG. 1)" to -- (see FIG. 1) --.

Column 9,
Line 24, change "determine" to -- determining --;
Lines 28, and 31, change "ST1" to -- ST11 --;
Line 32, change "ST2" (both occurrences) to -- ST12 --;
Line 43, after "maintained" insert -- at --.

Column 11,
Line 33, after "incrementing" insert -- of --;
Line 60, after "incrementing" insert -- of --.

Column 13,
Line 10, before "present" insert -- the --;
Line 41, change "SM24" to -- ST24 --.

Column 14, claim 1,
Line 19, change "said the door" to -- on the door --;

Column 14, claim 2,
Line 21, after "said" insert -- actual --;

UNITED STATES PATENT AND TRADEMARK OFFICE
CERTIFICATE OF CORRECTION

PATENT NO. : 6,208,102 B1
DATED : March 27, 2001
INVENTOR(S) : Taizo Kikuchi, Kazunari Ochi, Toru Namiki, Tatsumi Sakazume, Hiroshi Ono, Masami Sayama It is certified that error appears in the above-identified patent and that said Letters Patent is hereby corrected as shown below:

Column 14, claim 3,
Line 25, delete "actual".

Signed and Sealed this

Nineteenth Day of February, 2002

Attest:

Attesting Officer

JAMES E. ROGAN
Director of the United States Patent and Trademark Office